UNITED STATES PATENT OFFICE.

LEO DAFT, OF RUTHERFORD, NEW JERSEY, ASSIGNOR TO ELECTRO-CHEMICAL RUBBER & MANUFACTURING COMPANY, A CORPORATION OF NEW JERSEY.

RUBBER-COVERED METAL ARTICLE AND METHOD OF MAKING THE SAME.

1,124,302. Specification of Letters Patent. Patented Jan. 12, 1915.

No Drawing. Original application filed June 3, 1910, Serial No. 564,840. Divided and this application filed December 24, 1912. Serial No. 738,459.

*To all whom it may concern:*

Be it known that I, LEO DAFT, a subject of the King of Great Britain, and a resident of Rutherford, in the county of Bergen, in the State of New Jersey, have invented a new and Improved Rubber-Covered Metal Article and Method of Making the Same, this application being a division of my pending application Serial No. 564,840, filed June 3, 1910.

My invention relates to a new rubber covered metal article in which the rubber is vulcanized directly to the metal instead of being attached to it by gums or cement as heretofore, thereby producing an article in which the adhesion is much greater than the adhesion it has been possible to produce heretofore between rubber and metals.

I find that if alloys containing antimony and particularly alloys containing copper and zinc combined with the antimony are used as a base to which the rubber is vulcanized, a perfect adhesion may be produced between the rubber and the metal by heating the rubber to a vulcanizing temperature while in contact with the metal.

I find that satisfactory adhesion is produced between ordinary grades of rubber and an alloy of the following composition:

Copper _____ 62.66 per cent.
Zinc _____ 33.73 per cent.
Antimony _____ 3.61 per cent.

In producing the article, the surface of the metal base is first thoroughly cleaned, the rubber is then applied to it and the whole heated to a vulcanizing temperature, say, to 250 degrees Fahrenheit, for a period of about forty minutes.

The proportions of the various metals may be varied to some extent but the antimony should in no case exceed more than five per cent. of the whole nor should it be less than one per cent. of the whole. Satisfactory results are obtained from an alloy consisting of sixty per cent. copper, thirty-eight per cent. zinc and two per cent. antimony.

I find that the presence of tin prevents a perfect adhesion of the rubber and the metal when tin is present in quantities sufficient to give the alloy a stannous, or tinny character.

While I have described a form of my invention, I do not intend to limit myself to the form described, since it is obvious that the proportions of the various metals may be varied to produce equivalent results and that equivalents of the various metals might be used.

What I claim and desire to secure by Letters Patent is:

1. A rubber covered metal article, comprising a non-stannous base of an alloy of antimony in which the antimony does not exceed five per cent. of the whole, with a rubber covering vulcanized thereon.

2. A rubber covered metal article, comprising a non-stannous base of an alloy of antimony in which the antimony is not more than five per cent. of the whole or less than one per cent. of the whole, with a rubber covering vulcanized thereon.

3. A rubber covered metal article, comprising a non-stannous metal base, consisting of an alloy of antimony and copper in which the antimony is not more than five per cent. of the whole or less than one per cent. of the whole with a rubber covering vulcanized thereon.

4. A rubber covered metal article, comprising a non-stannous metal base of an alloy of copper, zinc and antimony in the proportions of approximately sixty per cent. copper, thirty-eight per cent. zinc and two per cent. antimony, with a rubber covering vulcanized thereon.

5. A rubber covered metal article comprising a metal base, consisting of a non-stannous alloy of copper, zinc and antimony in which the antimony is not more than five per cent. or less than one per cent. of the whole, with a rubber covering vulcanized thereon.

6. A method of attaching rubber to metals, which consists in bringing rubber containing a vulcanizing agent into engagement with the surface of a non-stannous alloy of antimony and copper, and vulcanizing said rubber upon the surface of said alloy.

7. A method of attaching rubber to metals, which consists in bringing rubber containing a vulcanizing agent into engagement with the surface of a non-stannous alloy of antimony, in which the antimony does not exceed five (5) per cent. of the whole, and vulcanizing said rubber upon the surface of said alloy.

8. A method of attaching rubber to metals, which consists in bringing rubber containing a vulcanizing agent into engagement with the surface of a non-stannous alloy of antimony, in which the antimony is not more than five (5) per cent. of the whole, or less than one (1) per cent. of the whole, and vulcanizing said rubber upon the surface of said alloy.

9. A method of attaching rubber to metals, which consists in bringing rubber containing a vulcanizing agent into engagement with the surface of a non-stannous alloy of antimony and copper in which the antimony is not more than five (5) per cent. of the whole, or less than one (1) per cent. of the whole, and vulcanizing said rubber upon the surface of said alloy.

10. A method of attaching rubber to metals, which consists in bringing rubber containing a vulcanizing agent into engagement with the surface of a non-stannous alloy of antimony, copper and zinc, in which the antimony is not more than five (5) per cent. of the whole, or less than one (1) per cent. of the whole, and vulcanizing said rubber upon the surface of said alloy.

11. A method of attaching rubber to metals, which consists in bringing rubber containing a vulcanizing agent into engagement with the surface of a non-stannous alloy of antimony, copper, and zinc, in the proportions of approximately two (2) per cent. antimony, sixty (60) per cent. copper and thirty-eight (38) per cent. zinc and vulcanizing said rubber upon the surface of said alloy.

12. A method of attaching rubber to metals, which consists in bringing rubber containing a vulcanizing agent into engagement with the surface of a non-stannous alloy of antimony, copper, and zinc, and vulcanizing said rubber upon the surface of said alloy.

LEO DAFT.

Witnesses:
LAURA E. SMITH,
WALTER S. JONES.